(12) United States Patent
Pahwa et al.

(10) Patent No.: US 11,612,857 B2
(45) Date of Patent: Mar. 28, 2023

(54) HONEYCOMB MATRIX COMPRISING MACROPOROUS DESICCANT, PROCESS AND USE THEREOF

(71) Applicant: Desiccant Rotors International Pvt. Ltd., Delhi (IN)

(72) Inventors: Deepak Pahwa, Delhi (IN); Anil Kumar Choudhary, Haryana (IN)

(73) Assignee: Desiccant Rotors International Pvt. Ltd., Delhi (IN)

( * ) Notice: Subject to any disclaimer, the term of this patent is extended or adjusted under 35 U.S.C. 154(b) by 0 days.

(21) Appl. No.: 15/078,667

(22) Filed: Mar. 23, 2016

(65) Prior Publication Data

US 2016/0199778 A1 Jul. 14, 2016

Related U.S. Application Data

(62) Division of application No. 13/501,894, filed as application No. PCT/IN2010/000675 on Oct. 12, 2010, now Pat. No. 9,327,268.

(30) Foreign Application Priority Data

Oct. 13, 2009 (IN) .......................... 2131/DEL/2009

(51) Int. Cl.
*B01J 20/00* (2006.01)
*B01J 20/10* (2006.01)
(Continued)

(52) U.S. Cl.
CPC ............ *B01D 53/28* (2013.01); *B01D 53/02* (2013.01); *B01D 53/06* (2013.01); *B01D 53/261* (2013.01); *B01J 20/10* (2013.01); *B01J 20/28045* (2013.01); *B01J 20/28071* (2013.01); *B01J 20/28073* (2013.01); *B01J 20/28083* (2013.01); *B01J 20/28085* (2013.01); *B01J 20/3071* (2013.01); *B01J 20/3078* (2013.01);
(Continued)

(58) Field of Classification Search
USPC ........................................................ 502/400
See application file for complete search history.

(56) References Cited

U.S. PATENT DOCUMENTS

| | | | |
|---|---|---|---|
| 4,871,607 | A | 10/1989 | Kuma et al. |
| 4,886,769 | A | 12/1989 | Kuma et al. |

(Continued)

OTHER PUBLICATIONS

Excerpt from ASHRAE Handbook—Funadmentals (SI), Chapter 32, Para. 5, col. 1, p. 32.4 (2009).
International Search Report of PCT/IN2010/00675 dated Aug. 9, 2011.

*Primary Examiner* — James E McDonough
(74) *Attorney, Agent, or Firm* — Caesar Rivise, PC

(57) ABSTRACT

Macroporous desiccant based honeycomb matrix containing the macroporous desiccant synthesized "in-situ", the desiccant having a differential water adsorption. Process for the "in-situ" preparation of the macroporous desiccant based honeycomb matrix including the steps of soaking honeycomb substrate impregnated with water glass, in aqueous metal salt(s) solution or acid solution, or combination thereof, until such time that the hydrogel honeycomb matrix is obtained and thermally activating the hydrogel honeycomb matrix to produce macroporous desiccant based honeycomb matrix.

5 Claims, 7 Drawing Sheets

*Working of a typical, microporous, thermally activated, desiccant dehumidification wheel/rotor*

(51) Int. Cl.
*B01D 53/02* (2006.01)
*B01D 53/28* (2006.01)
*B01J 20/30* (2006.01)
*B01J 20/28* (2006.01)
*B01J 20/32* (2006.01)
*B01D 53/06* (2006.01)
*B01D 53/26* (2006.01)

(52) U.S. Cl.
CPC ....... *B01J 20/3204* (2013.01); *B01J 20/3206* (2013.01); *B01J 20/3234* (2013.01); *B01J 20/3236* (2013.01); B01D 2253/106 (2013.01); B01D 2253/308 (2013.01); B01D 2253/311 (2013.01); B01D 2253/3425 (2013.01); B01D 2257/708 (2013.01); B01D 2257/90 (2013.01); B01J 2220/4831 (2013.01)

(56) References Cited

U.S. PATENT DOCUMENTS

| | | | |
|---|---|---|---|
| 4,911,775 A | 3/1990 | Kuma et al. | |
| 5,254,195 A | 10/1993 | Tseng et al. | |
| 5,435,958 A * | 7/1995 | Dinnage | B01J 20/28004 264/DIG. 48 |
| 5,667,560 A | 9/1997 | Dunne | |
| 5,683,532 A * | 11/1997 | Kuma | B01J 20/28011 501/12 |
| 6,187,381 B1 | 2/2001 | Tanabe et al. | |
| 6,344,073 B1 * | 2/2002 | Kurosawa | B01J 20/103 96/135 |
| 6,379,436 B1 | 4/2002 | Kuznicki et al. | |
| 6,559,096 B1 | 5/2003 | Smith et al. | |
| 6,630,206 B2 | 10/2003 | Aronson | |
| 2011/0265654 A1 | 11/2011 | Eisenhardt et al. | |

* cited by examiner

*Working of a typical, microporous, thermally activated, desiccant dehumidification wheel/rotor*

*Typical sectoral division of rotating desiccant wheel*

Working of a typical macroporous "passive" desiccant dehumidification wheel/rotor

*Typical sectoral division of "passive" rotating desiccant wheel*

*Working of a macroporous, thermally activated, desiccant dehumidification wheel/rotor with heat exchanger*

*Typical sectoral division of rotating desiccant wheel*

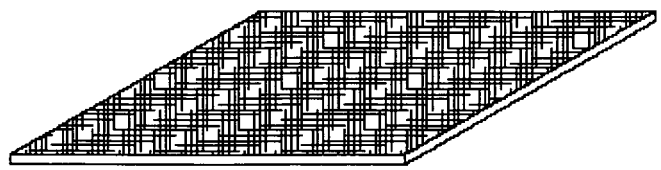
FIG.NO-4(a)
IN-SITU SYNTHESIZED DESICCANT PAPER
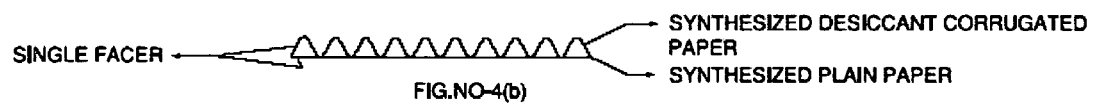
FIG.NO-4(b)
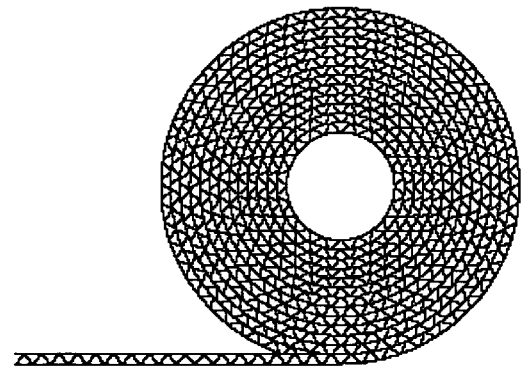
FIG.NO-4(c)
WINDING OF SINGLE FACER
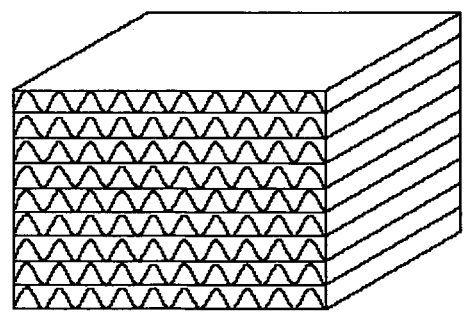
FIG.NO-4(d)
HONEYCOMB PASSIVE MATRIX

*Typical Isotherms*
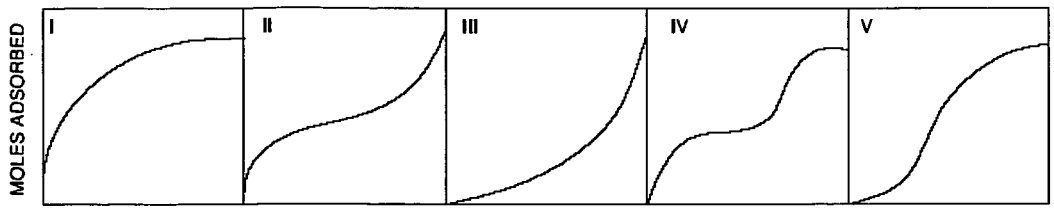
FIG.NO-5(a)
BRUNAUER CLASSIFICATIONS OF ISOTHERMS
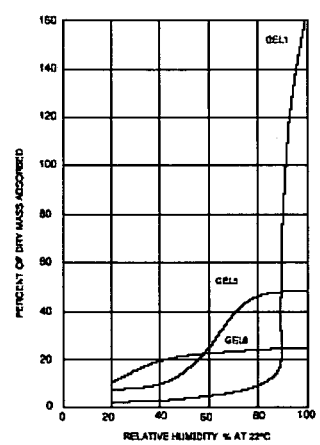
FIG.NO-5(b) ADSORPTION AND STRUCTURAL CHARACTERISTICS OF SOME EXPERIMENTAL SILICAGELS
2009 ASHARE HANDBOOK-FUNDAMENTAL
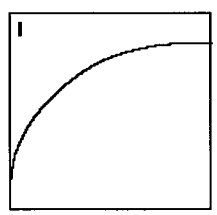
FIG.NO-5(c)
TYPICAL ISOTHERM OF MICROPOROUS DESICCANT (TYPE-I)
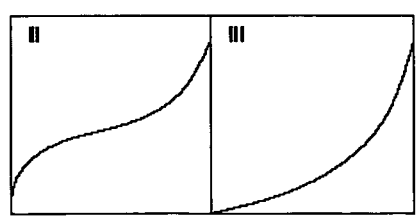
FIG.NO-5(d)
TYPICAL ISOTHERM OF MACROPOROUS DESICCANT (TYPE-II & III)

ISOTHERM FOR THE HONEYCOMB MATRIX
COMPRISING MACROPOROUS DESICCANT
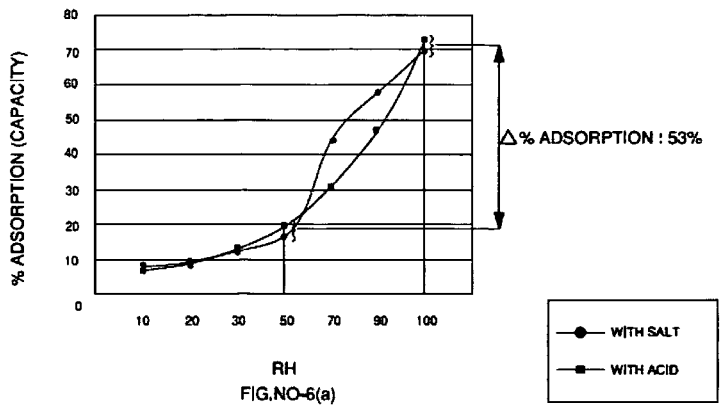
FIG.NO-6(a)
ISOTHERM DIFFERENTIATING THE PRIOR ART
FROM THAT OF THE PRESENT INVENTION
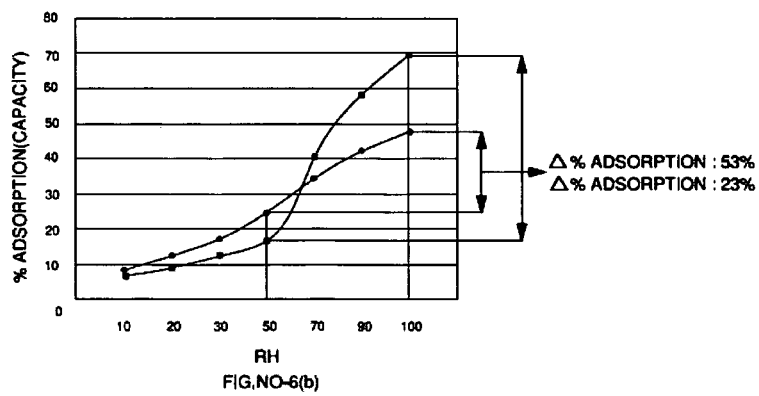
FIG.NO-6(b)
| PROPERTIES | MICROPOROUS MATRIX(G3MH) | MACROPOROUS MATRIX(G3MA) |
|---|---|---|
| SURFACE AREA m2/g | 522 | 382 |
| PORE VOLUME m3/g | 0.27 | 0.5 |
| PORE DIAMETER A° | 20-25 | 70-100 |
| Δ% ADSORPTION @100 % RH & 50 % RH | 23 | 53 |

*Chemical filter comprising the macroporous desiccant based honeycomb matrix*
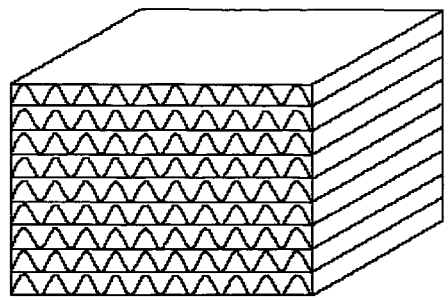
PLAIN MACROPOROUS BLOCK
FIG.NO-7(a)
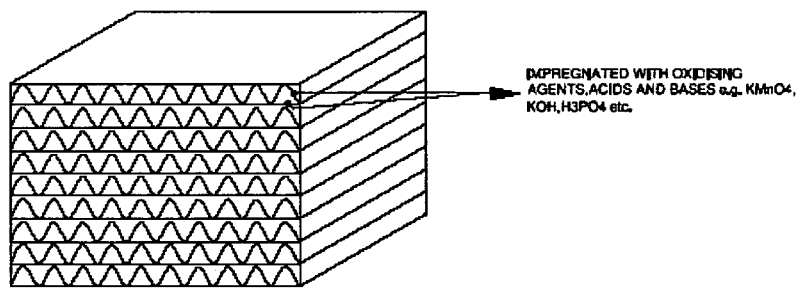
IMPREGNATED WITH OXIDISING AGENTS,ACIDS AND BASES e.g. KMnO4, KOH,H3PO4 etc.
IMPREGNATED MACROPOROUS BLOCK
FIG.NO-7(b)
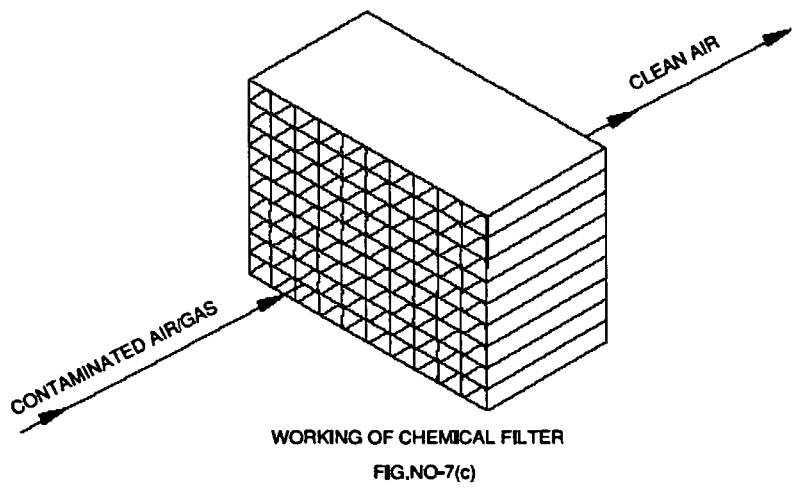
WORKING OF CHEMICAL FILTER
FIG.NO-7(c)

HONEYCOMB MATRIX COMPRISING MACROPOROUS DESICCANT, PROCESS AND USE THEREOF

TECHNICAL FIELD

The present invention relates to a honeycomb matrix comprising macroporous desiccant, its process of manufacture and use thereof.

BACKGROUND

Many illnesses have been related to the Indoor Air Quality, and are also known to have a direct impact on the productivity of a worker. Rising need for increased ventilation rates and controlled humidity level for improved Indoor Air Quality have thrown up both challenges and opportunities in the design of HVAC (heating, ventilating, and air conditioning) systems.

In HVAC and industrial processes, management of air and gases entails management of several of its' properties like temperature, humidity, particulate and gaseous contaminants, noise, etc.

There is now universal recognition of the importance to control humidity in controlled spaces especially in facilities with high occupancy rates such as schools, hospitals, cinema halls etc. Desiccant wheel based dehumidifiers are being increasingly used to control humidity in such applications.

One of the predominantly emerging approach to HVAC system design, to cater to large(r) ventilation rates, is to provide a dedicated outdoor air system, as a fresh air unit, to cater for the total fresh air load as well as to provide the necessary moisture removal for meeting the dehumidification (room internal latent) needs, and a separate unit or system is applied as a parallel unit to take care of the internal sensible load of the room or occupied space.

Thus there is a need to develop a variety of DOASs (Dedicated Outdoor Air Systems) for handling the fresh air and room's latent load through a fresh air unit. Some of the DOAS units or systems are purely based on use of mechanical refrigeration for both cooling and dehumidification, and there are others which, in combination with mechanical refrigeration/cooling, utilize either a variety of energy recovery wheels, singularly or in plurality, and in some instances also desiccant wheels which are either "passive" or "thermally activated".

Dehumidification can be carried out by either mechanical refrigeration or by using a desiccant dehumidifier which employs a desiccant material to produce the dehumidification effect. Desiccant materials have a high affinity for water vapor. An example of a commonly used desiccant material is silica gel. Typically their moisture content (moisture holding capacity) is a function of the relative humidity of the surrounding air.

The most commonly used adsorbents broadly are:
Synthetic zeolites/molecular sieves
Activated aluminas
Silica gel/metal silicates:
Adsorbents are granular, beaded, powder, or in several other forms e.g. cast, extruded, honeycomb matrix etc.

Para 5, column 1, pg 32.4, chapter 32 of 2009 ASHRAE Handbook—Fundamentals (SI) states as follows:

"Adsorption behaviour depends on (1) total surface area, (2) total volume of capillaries, and (3) range of capillary diameters. A large surface area gives the adsorbent a larger capacity at low relative humidities. Large capillaries provide a high capacity for condensed water, which gives the adsorbent a higher capacity at high relative humidities. A narrow range of capillary diameters makes an adsorbent more selective in the vapor molecules it can hold.

In designing a desiccant, some tradeoffs are necessary. For example, materials with large capillaries necessarily have a smaller surface area per unit of volume than those with smaller capillaries. As a result adsorbent are sometimes combined to provide a high adsorption capacity across a wide range of operating conditions. FIG. 5(b) illustrates this point using three noncommercial silica gel adsorbents prepared for use in laboratory research. Each has a different internal structure, but because they are all silicas, they have similar surface adsorption characteristics. Gel 1 has large capillaries, making its total volume large but its total surface area small. It has a large adsorption capacity at high relative humidities but adsorbs a small amount at low relative humidities.

In contrast, Gel 8 has a capillary volume one-seventh the size of Gel 1, but a total surface area almost twice as large. This gives it a higher capacity at low relative humidities but a lower capacity to hold the moisture that condenses at high relative humidities.

Silica gels and most other adsorbents can be manufactured to provide optimum performance in a specific application, balancing capacity against strength, mass, and other favorable characteristics."

Thus adsorption behaviour depends on total surface area and pore volume. Most of the prior art is related to desiccant matrixes that use desiccants which are microporous or of type I isotherm.

Dehumidification is considered as a key feature of HVAC systems for thermal comfort. When desiccant dehumidification is used for management and treatment of air at atmospheric pressure, mainly honeycomb type of matrixes are used in order to maximize the surface area in contact with air passing through/over the desiccant, and also minimize the use of desiccant as well as minimize the pressure drop of the air across the "desiccant bed".

The honeycomb matrixes can be formed using a variety of substrates like plastic sheet, metal/aluminum foil, organic and/or inorganic fiber substrates which are "paper" like, which at times can be quite porous. Depending upon the substrate of choice, the amount of desiccant to be "deposited/loaded" and the temperature at which the air/matrix will be working, following are some of the methods for deposition/loading the desiccant on the substrate to prepare the matrix.

a. coating
b. impregnation
c. in-situ synthesization

While "coating" or "impregnating" choice can be made from the variety of desiccant powders from various types I to V [FIG. 5(a)], as these are produced in bulk and for a variety of industrial applications other than HVAC air treatment, in-situ synthesization of desiccants, of the types: silica gels, and metal silicates, in the porosity of the porous inorganic fiber substrate, and formed into a honeycomb have been mainly for industrial and commercial desiccant dehumidifier applications, where the desiccant wheels are invariably thermally (re)activated, with air at elevated temperature, ranging from 60° C.~200° C.

As stated earlier above, some of the Dedicated Outdoor Air Systems (DOAS) units or systems are purely based on use of mechanical refrigeration for both cooling and dehumidification, and there are others which, in combination with mechanical refrigeration/cooling, utilize either a variety of energy recovery wheels, singularly or in plurality, and in some instances also desiccant wheels which are either "passive" or "thermally activated".

In the variety of DOASs, and other HVAC equipment, units configured with "passive" dehumidification wheels are gaining ground. The "passive" dehumidification wheels, have only recently begun to be applied. The "passive" desiccant wheels, as the name suggests, are wheels which are not thermally activated i.e. do not use any heat for regeneration. To understand this better please refer to FIG. 1a which shows typical thermally activated wheels.

As depicted in FIG. 1(b), in a rotating desiccant wheel, typically there are two sectors: process sector (2) and the reactivation sector (3), through which the honeycomb matrix or beds move/rotate. In the process sector, air or gas is dried, or moisture removed, which is picked up by the rotating wheel/bed. In the reactivation sector, this desiccant wheel mass/matrix is exposed to an air stream (8) which is elevated in temperature, which drives the moisture out of the desiccant, which is removed, on a continuous basis. When the air is heated and surrounds the desiccant mass/matrix in the reactivation sector, it is the vapour pressure difference in the desiccant mass and that of the air surrounding it which determines the amount of, and the rate at which, moisture is given up by the desiccant matrix/mass.

In thermally activated wheels, the regeneration air stream is typically elevated to temperatures ranging between 60° C. to 200° C., depending upon a variety of factors, including, but not limited to, the choice of desiccant, sectoral division between process and reactivation sectors, bed rotational speed, etc. These thermally activated wheels help in achieving "deep" dehumidification, and so far, all the development of honeycomb matrix based desiccant wheels has focused on maximizing moisture removal, at air inlet conditions which are normally below or between 10~50 grains/lbs (1.5 to 7 gms/kg), but can sometimes be as high as ambient moisture. Though desiccant coated or desiccant impregnated wheels have also been applied/used for this thermally activated wheel application, predominantly the development, and application, and use has been of honeycomb matrix in which the desiccant is synthesized "in-situ".

In the development of all these "in situ" synthesized desiccant wheels, the focus has been to minimize the desiccant pore size and maximize/optimize its surface (pore) area to obtain "deep dehumidification". Such desiccants created "in-situ" are often referred to as type I desiccant in which the majority of the pore sizes are distributed between 15 to 40 Å, and more specifically close to 20 Å. These are having the type I isotherm as shown in FIG. 5(c).

U.S. Pat. No. 4,886,769 relates to a method of manufacturing a microporous dehumidifier element which has a differential adsorption of about 10% at RH>10%. The said patent discloses an element (with sufficient physical strength) for adsorbing an ultra-low concentration gas which is obtained by using synthesized zeolite powder dispersed in an aqueous solution of water glass.

U.S. Pat. No. 4,911,775 relates to a method of manufacturing a honeycomb type dehumidifying element which has an adsorption capacity limited to 40-45% at RH>90%.

U.S. Pat. No. 4,871,607 relates to a humidity exchanger element which has excellent heat resistance without any possibility of deterioration in the temperature of not less than 100° C. This humidity exchanger has a limited adsorption capacity.

U.S. Pat. No. 5,254,195 relates to a process for preparing a moisture exchange element wherein the amount of adsorbent deposited on the surface of the substrate is increased by impregnating the substrate with colloidal silica in addition to metal salt and acid.

U.S. Pat. No. 5,435,958 discloses a process for manufacturing a humidity exchange element wherein the honeycomb matrix is soaked in an acidic solution containing at least a titanium inorganic salt to convert said sodium silicate water glass to a titanium-containing silicate hydrogel. This results in humidity exchange element with improved moisture adsorbing capacity and requires less energy to regenerate the matrix.

U.S. Pat. No. 5,683,532 relates to a method of manufacturing an active silica gel honeycomb adsorbent body for dehumidification which has high efficiency of dehumidification and small passing resistance of gas in small channels. The honeycomb structure is fired with air containing reduced oxygen at 500° C. to remove organic components in paper.

U.S. Pat. No. 6,187,381 discloses a process for manufacturing a dehumidifying element wherein the honeycomb is immersed in silica sol and dried followed by immersion alkali silicate (20-35 wt %) and alkali hydroxide (20-50 wt %). The ratio of silicon oxide to alkali oxide should not exceed 10. In the said patent the moisture adsorption at 90% RH is 16.5% only.

U.S. Pat. No. 6,344,073 relates to a dehumidifying element and process for preparing the same. The dehumidifying material comprises silica gel and metal oxide. This dehumidifying element can be utilized mainly at medium humidity conditions.

U.S. Pat. No. 6,630,206 discloses a method for manufacturing a dehumidifying element wherein molecular sieve is immersed into the water glass solution. The differential of water adsorption between 50 and 100% RH is less than 40%.

Thus it can be seen that the prior art employs mainly honeycomb matrix comprising microporous desiccant for dehumidification. Such a desiccant has the advantage that it provides larger surface area for adsorption of moisture but suffers from the disadvantage of small pore volume and hence can be utilized only in medium to low humidity conditions, which has been, hitherto, the focus of desiccant dehumidification.

Further, none of the dehumidification systems in the prior art provides high moisture adsorption capacity between 50 and 100% relative humidities. In fact the water adsorption (capacity) differential between 50 and 100% relative humidity for all the above patents stands at an amount less than 40%.

In some of the prior art showing configurations where "passive" dehumidification wheels were used, the desiccant is deposited on the substrate by coating or impregnation. However, said dehumidification wheels suffer from the disadvantage that binders were essential for impregnation and coating which reduced the efficacy of the wheel by masking the desiccant performance. Further, when the desiccant encountered saturated air, there is a tendency for the desiccant to be washed out with time.

Air to be treated, particularly outside air, other than water vapor, can contain several gaseous contaminants, e.g. VOCs, odors etc., and it would be desirable to remove these through the desiccant matrix. Air to be treated, particularly when it is pre cooled to near saturation, such gaseous contaminants are sometime water soluble and together are condensed in the macro porous desiccant mainly through capillary adsorption. In the prior art, microporous desiccants are mainly used, which exhibit limited capillary adsorption and therefore limited adsorption of gaseous contaminants.

Accordingly, to overcome the problems encountered in the prior art, the inventors of the present invention provide a honeycomb matrix comprising a macroporous desiccant prepared "in-situ" for use in "passive"/"active" dehumidification, and also as a chemical filter, as described herein below.

OBJECT AND SUMMARY

The principal object of the present invention is to provide a honeycomb matrix having a "differential" adsorption (capacity) of more than 50% and at least 40%, at relative humidities of 50% and 100%.

A further object of the present invention is to provide a honeycomb matrix comprising a macroporous desiccant prepared "in situ" to increase the adsorption capacity of adsorbent and for use in very high, near or at saturation, i.e. between 90-100% relative humidity.

Further, the object of the invention is to provide a high adsorption capacity desiccant matrix which is odorless, non-toxic and stable at normal (thermally activated) regeneration temperatures.

Another object of the present invention is to provide a "passive" desiccant wheel which has the highest water holding capacity at very high relative humidity (RH)/i.e. near saturated conditions.

Yet another object is to provide a chemical filter with the largest amount of impregnated chemical, for chemisorption, for a given physical size and geometry, and air carrying capacity, for a given pressure drop.

Still another object of the present invention is to provide a honeycomb matrix which is cost effective.

The present invention provides a honeycomb matrix comprising macroporous desiccant synthesized "in-situ". The desiccant has a differential water adsorption of more than 50% or at least 40% at relative humidities of 50% and 100%, a pore diameter in the range of 40 to about 200 Å and pore volume from about 0.40 to about 0.80 gm/cc.

The present invention further provides a process for the preparation of the honeycomb matrix comprising macroporous desiccant prepared "in-situ" comprising the steps of i. preparing honeycomb matrix in blocks/cylinders or some other shapes, from the substrate impregnated with water glass solution;

The substrate is made from a mixture of various inorganic or organic substances or combination thereof. The substance can be a fibre or pulp. The inorganic fibre is selected from glass fibre, ceramic, etc. and is preferably glass fibre with a fibre diameter of about 6 to about 18 micron, fibre length of about 6 to about 15 mm, and thickness of about 0.10 to about 0.50 mm, preferably 0.15 to 0.25 mm. The binder content of the fiberglass substrate is in the range of 6 to 20, preferably 6 to 10% and the basic weight of the substrate used in the process is 20 to 80 gsm, more preferably 20 to 45 gsm. The porosity of the fiber glass substrate is in the range of about 350 to about 500 cfm/ft$^2$@0.5 inch, preferably above 400 cfm/ft$^2$@0.5 inch water.

ii. soaking honeycomb substrate impregnated with water glass, in 4-25%, by weight, aqueous metal salt(s) solution or acid solution, or combination thereof, at a temperature of 10-80° C. till such time the hydrogel honeycomb matrix is obtained and;

The honeycomb matrix in block/cylinder or any other shape is optionally soaked in salt solution or acid solution or a combination thereof. Furthermore, the concentration of water glass solution is maintained from 15-40%, preferably 30%, more preferably 25% to obtain a suitable condition of the impregnated paper before corrugation. The water soluble silicates are preferably selected from neutral grade sodium silicate and potassium silicate. It is preferable to apply adhesive such as neutral grade sodium silicate to adhere the single facer one after another, before stacking or winding, but there are several known steps and art to achieve this.

iii. thermally activating the said hydrogel honeycomb matrix.

The thermal activation is carried at temperature from about 60° C. to about 150° C., preferably 140° C. The hydrogel honeycomb matrix may be optionally washed prior to thermal activation.

Chemical filters can be prepared using the honeycomb matrix by any conventional technique.

Chemical filters comprising macroporous desiccant based honeycomb matrix of the present invention impregnated with oxidizing agents, alkaline solution and weak acid solution have been used for purification of air. Said chemical filters can also be used with desiccant wheel dehumidifiers in HVAC applications, air handling units, which may further also incorporate a "passive wheel"

Desiccant wheel dehumidifier comprising the honeycomb matrix with macroporous desiccant prepared "in-situ" wherein "differential" adsorption (capacity) of the desiccant being more than 50% or at least 40% at relative humidities of 50 and 100%, a pore diameter of about 40 to about 200 Å and pore volume of about 0.40 to about 0.80 gm/cc. Said desiccant wheel can be used as "active"/"passive" wheel in dehumidifiers in HVAC applications.

The present invention will now be discussed with reference to the accompanying drawings.

BRIEF DESCRIPTION OF DRAWINGS

FIGS. 3(b) and 3c depict the typical sectoral division of the desiccant wheel of FIG. 3a.

FIG. 4(a-d) depicts the "in-situ" synthesized paper, single facer, winding of single facer, and honeycomb matrix.

FIG. 5a depicts the typical Brunauer classification of isotherms.

FIG. 5(b) depicts the isotherm for the adsorption and structural characteristics of some experimental silica gel.

FIG. 5(c) depicts the typical type-I isotherm of microporous desiccant.

FIG. 5(d) depicts the typical type-II and III isotherm of a macroporous desiccant.

FIG. 6(a) depicts the isotherm for the honeycomb matrix comprising macroporous desiccant.

FIG. 6(b) depicts the isotherm differentiating the prior art from that of the present invention.

FIG. 7(a-c) depicts the chemical filter comprising the macroporous desiccant based honeycomb matrix.

DETAILED DESCRIPTION

The present invention provides the synthesis and creation "in-situ" of a new desiccant of type II/III in the porosity of the substrate of the honeycomb. The desiccant wheel matrix created is such that maximum difference is achieved between the water holding capacity at 50% relative humidity and 100% RH. The isotherm for such commercially available type II, III desiccants is shown in FIG. 5(d). To create a sufficient driving force or vapor pressure differential, this difference in moisture holding capacity i.e. moisture to desiccant weight to ratio, should be at least 40%, but preferably 50% or more as illustrated in FIG. 6(a). In one of the embodiments of the present invention the percentage water is greater than 60% at a relative humidity of 100%.

Desiccant wheels for dehumidifiers for the purpose of the present invention are intended to include "passive" or "active" desiccant wheels.

Figure 1A:
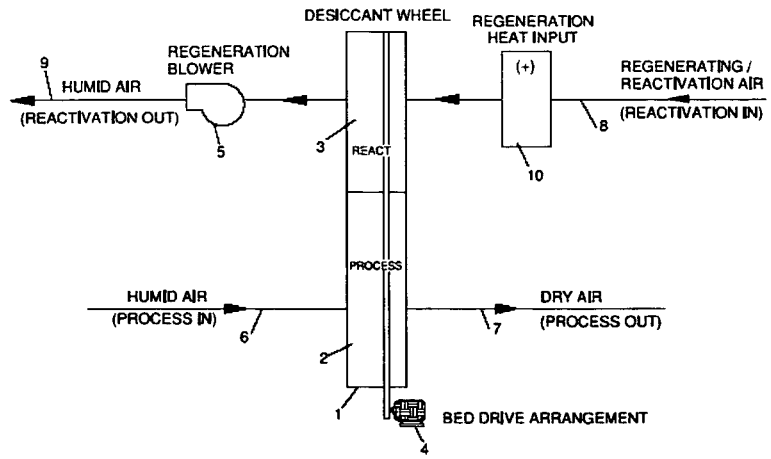
FIG. 1(a) depicts the working of a typical microporous, thermally activated, desiccant dehumidification wheel/rotor.
Figure 1B:
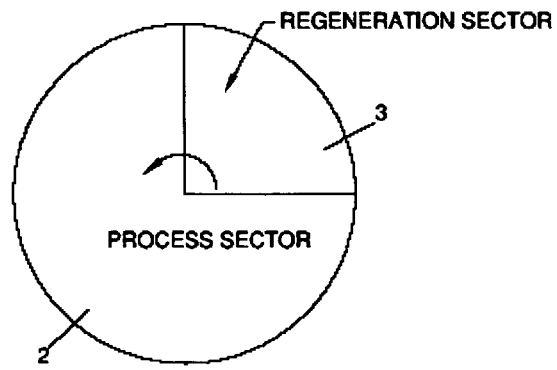
FIG. 1(b) depicts a typical sectoral division of rotating desiccant wheel.
Figure 2A:
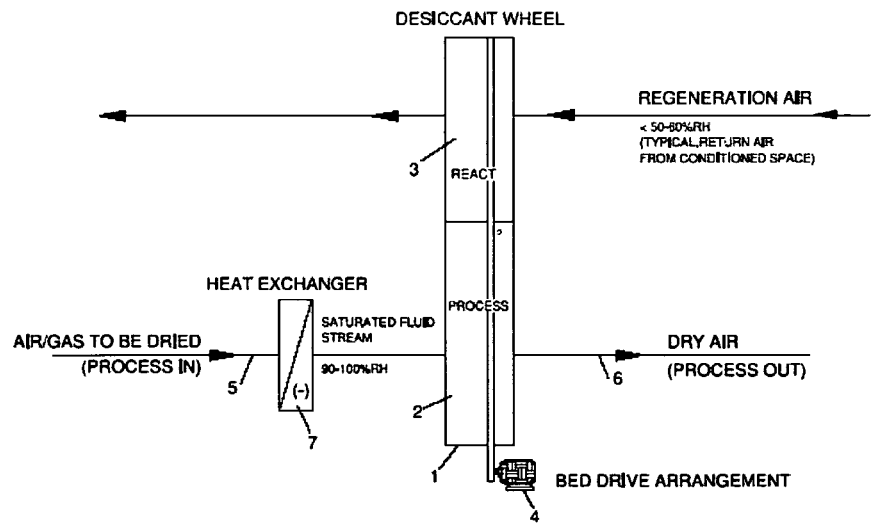
FIG. 2(a) depicts the working of a typical macroporous "passive" desiccant dehumidification wheel/rotor.
Figure 2B:
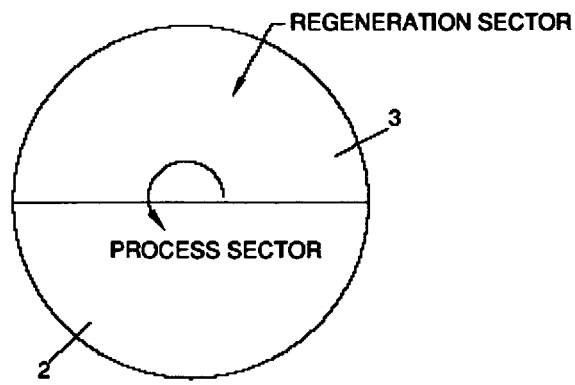
FIG. 2(b) depicts typical sectoral division of "passive" rotating desiccant wheel.
Figure 3A:
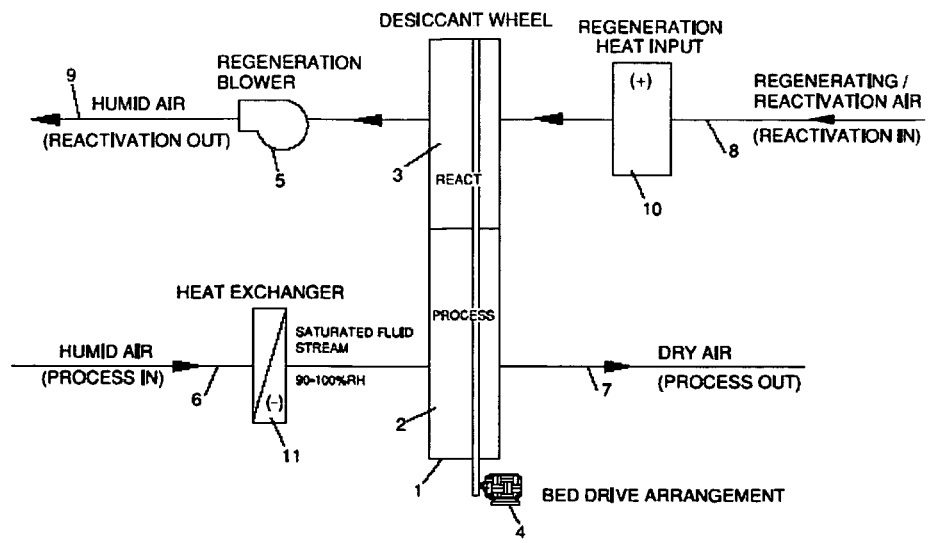
FIG. 3(a) depicts of a typical macroporous, thermally activated, desiccant dehumidification wheel/rotor with a heat exchanger.
Figure 3B:
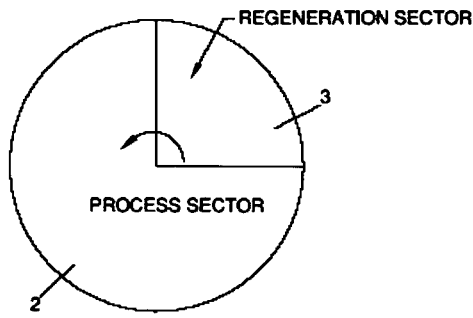
Figure 3C:
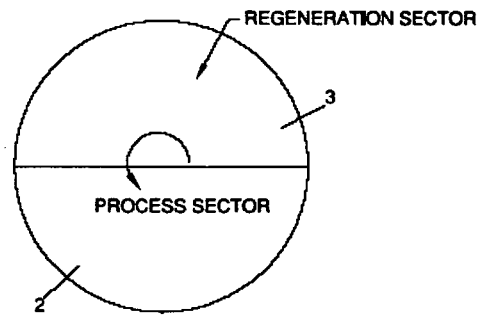

In "passive" wheels as depicted by FIG. 2(a), which do not employ any heated air or fluid for regeneration or reactivation of the honeycomb matrix, there is limited means to regenerate the desiccant wheels, unless a driving force can be created to drive the moisture out of the desiccant matrix. During regeneration, the "passive" desiccant wheels, therefore, have to rely on the way they are applied so as to make available or maximize this driving force. Typically, in the way the "passive" wheels are being currently applied, the process side of the wheels matrix is exposed to a saturated fluid stream i.e. at 100% relative humidity. To regenerate this wheel, fluid/air is used which is typically room return air, which typically, is at 50% relative humidity. Hence the driving force will be the vapor pressure difference that will be available and created by the relative humidity difference when desiccant is saturated, and for regeneration is surrounded by air having a relative humidity of 50%. As "passive" wheels do not see high or elevated temperature for regeneration, so far use has been made of commercially available type II or III desiccants by either coating these onto, or impregnating into the substrate of the wheel matrixes. However, to synthesize and create "in-situ" such a desiccant, in the porosity of the substrate of the wheel matrixes, is an unknown, and challenging, and yet very much needed requirement. Shown in FIG. 5(c-d) are isotherms of type I and type II/III material. As will be observed, type I desiccant has sufficient and considerable moisture holding capacity at mid 50s or lower relative humidity, at which such desiccants are used. On the other hand, type II/III desiccant have a very high moisture holding capacity at 90-100% saturation/relative humidity i.e. saturation to near saturation level.

Another area of increasing and differentiating application for dehumidification wheel is where bulk of the water is first removed with the help of a refrigerant or chilled fluid fed heat exchanger following which air is saturated i.e. at 100% relative humidity, before entering the dehumidification wheel. While the application for such wheels often requires thermal activation in the regeneration air circuit, the desiccant synthesized in the matrix is required to perform with maximum moisture removal at such saturated conditions. All currently available desiccant dehumidification wheels which have type I desiccant synthesized "in-situ" exhibit limited performance i.e. moisture removal when exposed to saturated inlet conditions as these are mainly microporous desiccant matrixes. The honeycomb matrix with macroporous type II/III desiccant, synthesized "in-situ", for such applications, with saturated feed air, exhibits about 10% more moisture removal compared to the microporous type I type desiccant wheels currently available on the market. Consequently this translates into a major 10% energy saving i.e. energy consumed, for the same amount of moisture removed, which is a significant advancement for a desiccant honeycomb matrix, which is thermally activated, and exposed to saturated "process in" air.

Honeycomb type wheels, as currently available in the market, with "in-situ" silica gel/metal silicate synthesized in and around the substrate have a good moisture removal from an air stream having a relative humidity of 5 to 100%. In the development of such desiccant matrixes, the object has been to focus on microporous desiccants which have a high surface area and have a moisture equilibrium ranging from 7 to 9% at 10% RH to 35 to 40% at 90% RH. Such microporous desiccants are limited in pore volume, as the goal is to maximize surface area. Such microporous desiccants have an average pore size of about 18-25 Å.

While there are several definitions, in published literature, separating the pore size range of microporous, macroporous, mesopore materials, the increase in pore size, more specifically increase in pore volume, and the increased moisture holding capacity at 90% RH are all indicative of macroporous or mesoporous material, generally of the type II & III isotherm.

The desiccant dehumidification wheels have hitherto, till a few years ago, been mainly thermally activated. Being thermally activated the object has been to maximize the performance of moisture removal over the widest range of inlet humidity condition. This is typically achieved with a micropore type desiccant which provides maximum/optimum surface area, and generally has pore distribution between 18 to 25 angstrom.

In the prior art there has been an increasing system design application where maximum moisture is first removed by pre-cooling before feeding the "process air" through the desiccant dehumidifier wheel. In such cases, the desiccant wheel invariably sees saturated (100% RH) air entering the process part of the wheel. This throws up the need and opportunity to create a desiccant honeycomb matrix which will have a high moisture removal potential when the entering air is saturated or near saturated i.e. have >90% relative humidity. Highest moisture removal at >90% RH would typically require a macroporous matrix which should have high moisture holding capacity (>60%) at 100% RH, as opposed to micropore material which have been generally been available and applied to the whole spectrum including the high humidity applications as well.

In recent years, system designs have been configured employing a "passive" dehumidification wheel which does not require external thermal/heat of reactivation. Such systems invariably see near saturated air entering the dehumidification wheel.

The present invention provides honeycomb matrix comprising macroporous desiccant prepared "in-situ", the said desiccant having differential adsorption more than 50% or at least 40% at relative humidities of 50% and 100%, a pore diameter of about 40 to about 200 Å and pore volume of about 0.40 to about 0.80 gm/cc.

A "passive" desiccant wheel employing said macroporous desiccant has the highest water holding capacity at the high RH/near saturated conditions.

The invention further provides process for the preparation of the honeycomb matrix comprising macroporous desiccant prepared "in-situ".

The process for the preparation of the honeycomb matrix comprising macroporous desiccant prepared "in-situ" comprises the steps of:

soaking honeycomb substrate impregnated with water glass, in 4-25%, by weight, aqueous metal salt(s) solution or acid solution, or combination thereof, at a temperature of 10-80° C. till such time the hydrogel honeycomb matrix is obtained and;

thermally activating said hydrogel honeycomb matrix to produce macroporous desiccant based honeycomb matrix The hydrogel honeycomb matrix may be optionally washed before the thermal activation step.

A macroporous desiccant based honeycomb matrix comprises of a flat and corrugated sheet of active desiccant, having a wave height between 0.8 to 5 mm, preferably between 1.0-2.5 mm, synthesized into the pores of the substrate. The substrate can be organic or inorganic substrate such as fiber glass, kraft paper, ceramic paper etc.

In one embodiment of the present invention the substrate used in the desiccant based honeycomb matrix is a fibre glass substrate which is a highly porous material having a fibre diameter of 6-18 micron, fibre length 6-15 mm and thickness of 0.1-0.5 mm and preferably 0.15-0.25 mm. The binder content of the fiberglass substrate used in the said matrix is between 6-20%, preferably 6-10%, said binder preferably being polyvinyl alcohol. When subjected to thermal heating/regeneration, the macroporous desiccant based honeycomb matrix using an inorganic fibre substrate with low binder content is also environment friendly.

The basic weight of the substrate used in the process is 20-80 gsm, preferably 25 to 45 gsm. The other very important characteristics of the porous substrate used in the process are porosity which should be 350-500, preferably above 400 cfm/ft2@0.5 inch water. The flat and the sheet meant for corrugation are first passed through the desired concentration of water glass solution to get the right condition of the impregnated paper before corrugation. The matrix is treated with divalent or trivalent aqueous metal salts or any strong/weak acid, be it inorganic/organic or combination thereof. Examples of weak acids are phosphoric acid and acetic acid while strong acid can be selected from hydrofluoric acid, hydrochloric acid, sulphuric acid, nitric acid etc. In case of water glass, potassium silicate and sodium silicate are generally used. However, sodium silicate is preferred due to its low cost, high solubility of byproducts, better bonding strength and easy availability. It is observed that treating the matrix with salt makes it very water washable.

The corrugated sheet is produced by methods well known in the art.

The honeycomb matrix produced as above either in the block or cylindrical form is soaked in water soluble metal salt/salts in different proportions and other forms of solution to produce silicate hydrogel. The reaction between water glass silicates with metal salts to form insoluble metal silicate hydro gel is given in table below:

The washing of the gel matrix is essential in order to remove the byproducts and excess reactants formed during the synthesis of the active materials. The higher acidity or lower pH of gel matrix due to presence of excess reactants deteriorates the construction material used in the system. The gelling pH of the matrix or the concentration of reactant/reactants, temperature, reaction time used in the process change the active material characteristics such as pore size, porosity, pore volume and surface area. Table 3 below gives the characteristics of active materials (of high humidity isotherms) produced at different concentration of salt/acid or salt and acid solution.

The said element was further dried under specified conditions to convert the hydrogel into the aerogel. It has been found that type of silicates, types of salts its pH, concentration, temperature and time during which the gel is aged or otherwise treated greatly affects the gel characteristics such as pore diameter, pore volume, surface area, adsorption capacity etc. The other important factors which affect the gel characteristics are the salt contents and surface tension of the liquid medium as it is being evaporated from the pores of the gel.

The comparison of the characteristics of the prior art honeycomb matrix with respect to the honeycomb matrix according to the present invention is given below.

| Characteristics | Prior Art | New Invention |
|---|---|---|
| Pore size (Å) | 20-35 | 40-200 |
| Pore volume (gm/cc) | 0.20-0.30 | 0.40-0.80 |
| Surface area (m²) | 400-500 | 300-400 |
| % Water adsorption | | |
| RH-I0 | 7-9 | 7.-8 |
| RH-20 | 11-15 | 9-10 |
| RH-30 | 12-18 | 11-13 |
| RH-50 | 15-25 | 16-20 |
| RH-70 | 20-35 | 35-45 |
| RH-90 | 26-40 | 53-60 |
| RH-I00 | 35-45 | 65-75 |
| Difference @ 50% RH & 100% RH | 20 | 50-55 |

To produce a chemical filter the said produced aerogel is immersed/impregnated with oxidizing agents solution, alkaline solution and weak acid solution of different concentration at different temperature for different soak time. When the honeycomb is sufficiently impregnated with solution, the excess impregnated is drained of and kept in another vessel after readjusting the concentration.

The time required for full impregnation is variable with the structure of the adsorbent, temperature and the other factors. The honeycomb material is then placed in an oven and heated until the free moisture and water are evaporated or driven out of the matrix to certain limits by leaving impregnating material within the pores of honeycomb silicate aerogel material.

It is preferred that the temperature range of drying of the honeycomb material should be in the range of 60° C. to 140° C. The exposure time during heating is varied with quality and quantity of materials, heating efficiency and other factors. After preparation, the honeycomb matrix is impregnated with impregnants is preserved until ready for use.

In the experiments, the impregnants used are potassium or sodium permanganate, sodium or potassium hydroxide and weak acid such as phosphoric acid. The loading of impregnants depends on various factors such as types of desiccants, concentration of impregnants, soak time, temperature, no of dips etc.

The table shown below gives details of factors affecting percentage of loading of impregnant/impregnants (Potassium permanganate or sodium permanganate) and adsorption capacity of impregnated honeycomb desiccant based matrix.

| A. CONCENTERATION OF $KMnO_4$ | | | | | | | |
|---|---|---|---|---|---|---|---|
| | microporous | | | | macroporous | | |
| Parameters | C1 | C2 | C3 | C4 | C1 | C2 | C3 | C4 |
| 1. % Loading | 2.6 | 3.2 | 6 | 7 | 4.0 | 6.6 | 8.1 | 8.1 |
| 2.. % Adsorption | 30 | 31 | 29 | 32 | 38 | 40 | 39 | 39 |

| B. SOAK TIME OF $KMnO_4$ | | | | | | | |
|---|---|---|---|---|---|---|---|
| | microporous | | | | macroporous | | |
| Parameters | S1 | S2 | S3 | S4 | S1 | S2 | S3 | S4 |
| 1. % Loading | 3.0 | 5.0 | 6 | 11 | 6 | 9 | 17 | 21 |
| 2.. % Adsorption | 33 | 31 | 25 | 26 | 37 | 36 | 35 | 32 |

| C. TEMPERATURE OF $KMnO_4$ | | | | | | |
|---|---|---|---|---|---|---|
| | microporous | | | macroporous | | |
| Parameters | T1 | T2 | T3 | T1 | T2 | T3 |
| 1. % Loading | 1.5 | 5.0 | 6.3 | 5.8 | 8.3 | 8.3 |
| 2.. % Adsorption | 35 | 30 | 32 | 40 | 37 | 36 |

| D. SUCCESSIVE DIPPING IN $KMnO4$ | | | | | | |
|---|---|---|---|---|---|---|
| | microporous | | | macroporous | | |
| Parameters | D1 | D2 | D3 | D1 | D2 | D3 |
| 1. % Loading | 6.8 | 8.5 | 8.4 | 7.5 | 10 | 12 |
| 2.. % Adsorption | 30 | 31 | 30 | 38 | 38. | 34 |

The concentrations, soak time, solution temperature, successive dipping, and surface properties of active material play an important role in achieving the twin objective-of loading and absorption. The said objective is preferably achieved if concentration of soaking solution is in the range of 5-15%, most preferably 10-12%, with soaking time in the range of 15-120 minutes, more preferably 15 minutes, at 10-80° C., more preferably at 50° C. with macroporous desiccant only.

The method of impregnation of alkali preferably sodium or potassium hydroxide or of acid preferably phosphoric acid with hybrid desiccant macroporous desiccants (Insoluble metal silicate and activated carbon acid) is described herein.

In order to prepare a chemical filter impregnated with acid or alkali, a slurry of activated carbon is prepared in water glass solution and honeycomb matrix is wounded in the form of block or cylindrical. The said honeycomb matrix supported with water glass and activated carbon is treated with acid or base as described.

The desiccants (Hybrid) supported honeycomb matrix is impregnated with different concentration of impregnates such as potassium permanganate, potassium hydroxide, sodium hydroxide, phosphoric acid etc, preferably in the range of 4-15%, more preferably 10% in the case of $KMNO_4$, 4% in the case of alkali and 6% in the case of phosphoric acid at different temperatures, more preferably at ambient temperature for different soak time from 10 to 60 minutes, more preferably 15 minutes to get the maximum loading with high CTC adsorption capacity.

The desiccant of the instant invention is prepared "in-situ" in a "passive" dehumidification wheel. Such a dehumidification wheel has a higher rate of adsorption at RH>50% as compared to the prior art. The differential adsorption between relative humidity of 50 and 100% for the desiccant being at least 40% as shown in FIG. 6(a)

The advantage and performance improvement of the macropore matrix in the "passive" dehumidification" mode, and the high humidity (HH) thermally activated mode, are clearly made out from the well documented test data. All testing has been done relative to and on a comparative basis with micropore desiccant matrixes.

Tests were conducted to bring out performance comparison between the macropore of the instant invention (G3MA) and the micropore (G3MH) of the prior art.

Performance Comparison Between G3MA Series (Sample G3 MA-E) and G3MH Series (200 mm Deep) at 515/600 SFPM
Reference—Test No 307 TO 311

TABLE 1

| | DELTA W (gr/lb) | | |
|---|---|---|---|
| RPH | G3MA SERIES (Sample G3 MA-E) | G3MH SERIES | % PERFORMANCE CHANGE |
| 4 | 11.9 | 6.3 | 88.9 |
| 6 | 12 | 6.8 | 76.5 |
| 8 | 12.2 | 7.9 | 54.4 |
| 10 | 11 | 7.8 | 41.0 |
| 12 | 10.9 | 7.6 | 43.4 |
| 15 | 10.6 | 7.4 | 43.2 |
| | | | 57.9 AVERAGE |

G3MA stands for Generation 3 macropore;
G3MH stand for Generation 3 micropore.
It was found that G3MA series performance is better by 57.9% than of equivalent G3MH rotor.

Tables 2 and 3 show an adsorption differential of 20% and 40% for desiccants adsorbing at medium and high humidity respectively. It can be seen from table 4 that the adsorption differential for the dehumidifier of the instant invention, between 50 and 100% RH is more than 50%.

TABLE 2

| Medium humidity Isotherm | |
|---|---|
| Relative Humidity | % Water Adsorption |
| 10 | 8.8 |
| 20 | 12.93 |
| 30 | 17.17 |
| 50 | 26.6 |
| 70 | 34.29 |
| 90 | 44.65 |
| 100 | 48.95 |

TABLE 3

| High Humidity Isotherm | | | | |
|---|---|---|---|---|
| Relative Humidity | HH-1 | HH-2 | HH-3 | HH-4 |
| 10 | 8.32 | 9.01 | 7.02 | 7.74 |
| 20 | 14.6 | 10.76 | 9.01 | 10.41 |
| 30 | 17.2 | 16.91 | 12.24 | 11.64 |
| 50 | 20 | 21.54 | 16.43 | 18.57 |
| 70 | 40.7 | 35.48 | 43.3 | 31.26 |
| 90 | 60.95 | 53.77 | 58.55 | 51.88 |

TABLE 3-continued

High Humidity Isotherm

| Relative Humidity | HH-1 | HH-2 | HH-3 | HH-4 |
|---|---|---|---|---|
| 100 | 65 | 62.2 | 69.42 | 68.69 |
| Difference of adsorption at 50% & 100% RH | 45% | 41% | 53% | 50% |

In HVAC and air treatment, chemical filters are commonly applied, in addition to particulate filters. Chemical filters can be prepared, using the honeycomb matrix, by any conventional technique. Said filters use the principal of chemisorption. In a chemical filter, gases are "filtered" and "cleaned out" when they are passed through a chemical filter. The "cleaning" of the gas occurs at the molecular level when (pollutant) gas molecules react with "chemical" in the Chemical filter. This reaction is referred to as chemisorptions. The chemical(s) in/on the chemical filter get consumed over time as it reacts with the gases which are cleaned out through this reaction. The object is, therefore, for the chemical filter to have the largest amount of chemical, for reaction, for a given physical size and geometry, and air carrying capacity, for a given pressure drop.

The testing has shown that macroporous desiccant matrix shows outstanding characteristics by way of increased % "loading" content compared to microporous desiccant matrix of an identical type, by a factor of 2 to 3 times.

Adsorbates other than water vapour can also be adsorbed in the macroporous desiccant of the present invention and include a variety of gases, odor elements, volatile organic compounds etc. These adsorbates/contaminants are adsorbed by the macroporous material of the instant invention mainly by capillary adsorption and are substantially and regularly desorbed on the regeneration side of the desiccant wheel matrix, thereby exhibiting strong ability to remove contaminants from the supply air stream.

Thus the honeycomb matrix with macroporous desiccants is having the advantage of adsorbing gaseous contaminants which phenomena substantially limits the passing through of the gaseous contaminants through the honeycomb matrix into the supply stream.

In one of the embodiments of the present invention, the macroporous desiccant based honeycomb matrix is made bacteriocidal, by treating the same with antibacterial agents such as titanium and silver or salts thereof.

A further embodiment provides a "passive"/"active" wheel and "passive/"active" wheel dehumidifier comprising the honeycomb matrix with macroporous desiccant prepared "in-situ" wherein differential adsorption (capacity) of the desiccant being more than 50% or at least 40% at relative humidities 50 and 100%, a pore diameter of about 40 to about 200 Å and pore volume of about 0.40 to about 0.80 gm/cc.

In still another embodiment of the present invention, the macroporous desiccant based honeycomb matrix is water washable.

In yet another embodiment, the present invention provides a "passive" wheel dehumidifier in HVAC applications comprising the honeycomb matrix based macroporous desiccant as described above.

EXAMPLES

1. A fibre glass substrate with a polyvinyl alcohol binder content of 15% is immersed in 20% sodium silicate solution and is dried at a temperature of 60-80° C. prior to corrugation. The substrate is formed into a single facer while adhering two similar substrates, the said single facer is then converted into a round honeycomb matrix. The said matrix is subsequently treated in a 15% aluminum sulphate solution bath at a temperature of 70° C. for 40 minutes. After the hydrogel has been formed in the matrix, the said matrix is water washed and then dried for one hour at a temperature of 60° C. and then thermally activated at a temperature of 120° C.
2. A fibre glass substrate with a polyvinyl alcohol binder content of 12% is immersed in 25% sodium silicate solution and is dried at a temperature of 80-100° C. prior to corrugation. The substrate is formed into a single facer while adhering two similar substrates, the said single facer is then converted into a block honeycomb matrix. The said matrix is subsequently treated in a 6% phosphoric acid bath at a temperature of 70° C. for 25 minutes. After the hydrogel has been formed in the matrix, the said matrix is water washed and then dried for two hours at a temperature of 80° C. and then thermally activated at a temperature of 140° C.

The various embodiments described above can be combined to provide further embodiments. All of the U.S. patents, U.S. patent application publications, U.S. patent applications, foreign patents, foreign patent applications and non-patent publications referred to in this specification are incorporated herein by reference, in their entirety. Aspects of the embodiments can be modified, if necessary to employ concepts of the various patents, applications and publications to provide yet further embodiments.

Although the disclosure of system and method has been described in connection with the embodiment of the present disclosure illustrated in the accompanying drawings and examples, it is not limited thereto. It will be apparent to those skilled in the art that various substitutions, modifications and changes may be made thereto without departing from the scope and spirit of the disclosure.

We claim:

1. A process for in-situ preparation of a macroporous desiccant based honeycomb matrix comprising the steps of:
   i. soaking a honeycomb substrate impregnated with water glass, in 4-25% by weight phosphoric acid, at a temperature of 10-80° C. until such time that a hydrogel honeycomb matrix is obtained;
   ii. washing the hydrogel honeycomb matrix; and
   iii. thermally activating the hydrogel honeycomb matrix at a temperature of 140° C. to produce the macroporous desiccant based honeycomb matrix.

2. The process as claimed in claim 1, wherein the hydrogel honeycomb matrix comprises at least one substrate selected from the group consisting of an organic substrate and an inorganic substrate.

3. The process as claimed in claim 2, wherein the at least one substrate comprises fiber or pulp.

4. The process as claimed in claim 1, wherein the water glass is neutral grade sodium silicate or potassium silicate.

5. The process as claimed in claim 1, wherein the honeycomb substrate is soaked for about 15 to 120 minutes to obtain the hydrogel honeycomb matrix.

\* \* \* \* \*